Figure 1:
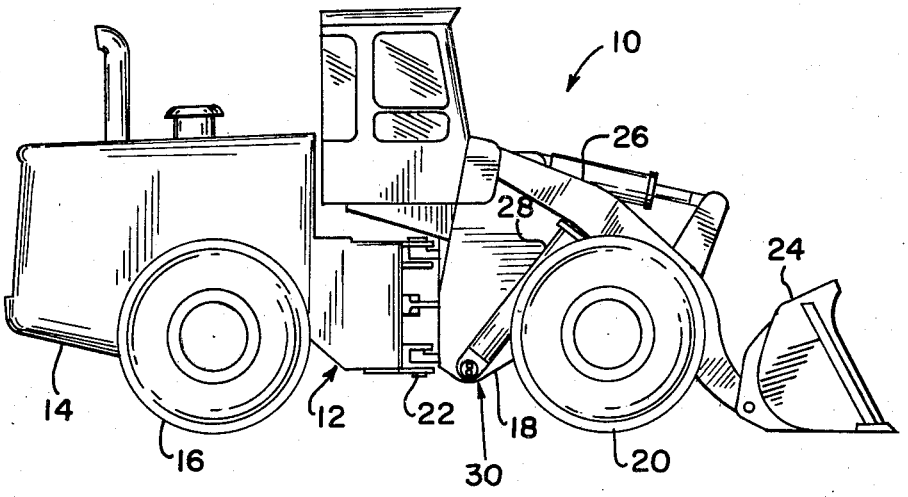
Figure 2:
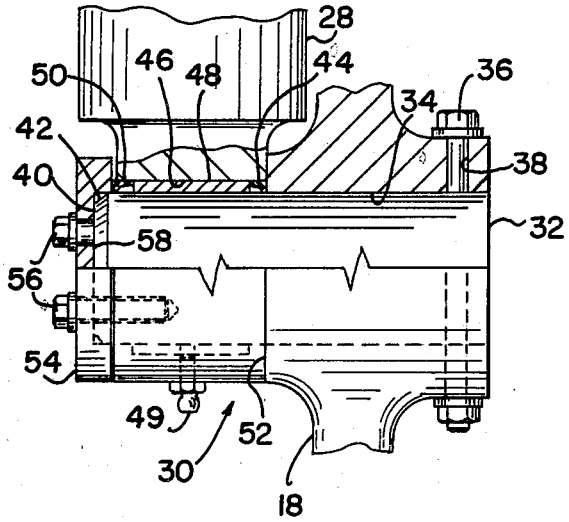

United States Defensive Publication [19] (H) [11] T103,302

Kerkman [43] Aug. 2, 1983

[54] COUNTERBOARD RETAINING CAP FOR CHAMFERED STUB SHAFT

[76] Inventor: Thomas W. Kerkman, Rte. 2, Box 278, Salem, Wis. 53168

[21] Appl. No.: 338,390

[22] Filed: Jan. 11, 1982

[51] Int. Cl.[3] ..... B66F 9/00

[52] U.S. Cl. ..... 414/722; 37/DIG. 9; 403/154; 403/163

[57] ABSTRACT

A sealed pivotal connection includes a bore member having a chamfered end stub shaft, a pivoting member journalled on the stub shaft and having inner and outer grease seals, and an end retainer cap attached to the stub shaft end having a recess receiving the entire chamfered end of the stub shaft to assure location of the outer grease seal on the cylindrical portion of the stub shaft.

3 Claims, 1 Sheet Drawing,

5 Pages Specification

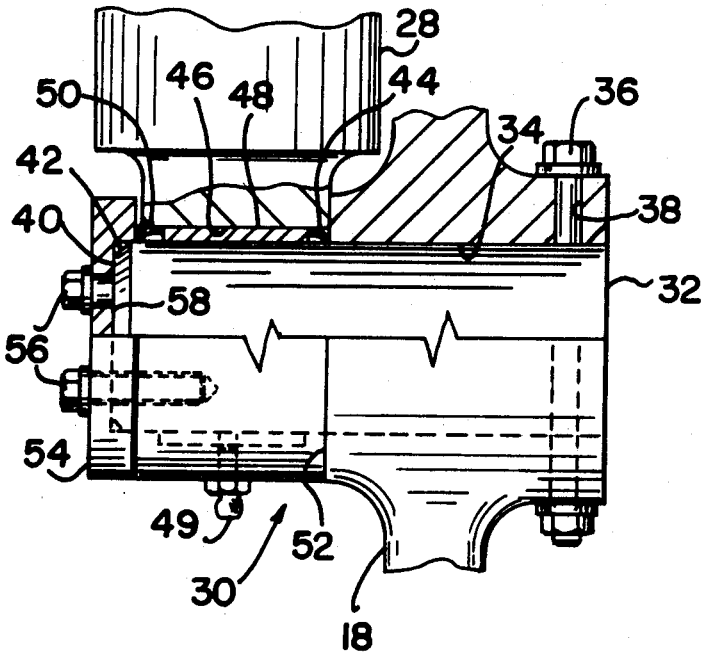

The file of this unexamined application may be inspected and copies thereof may be purchased (849 O.G. 1221, Apr. 9, 1968).